Figure 1:
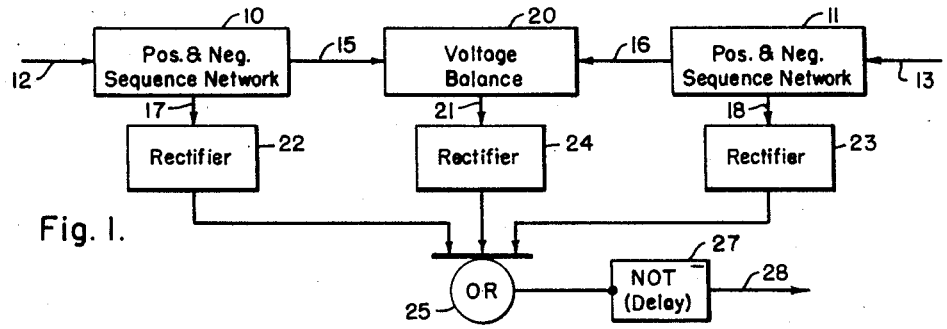

Dec. 17, 1957

R. F. KARLICEK 2,817,024

SYNCHRONIZING APPARATUS

Filed Feb. 29, 1956

WITNESSES:
Bernard R. Gieguay
Leon J. Vaga

INVENTOR
Robert F. Karlicek

BY
Francis V. B. Giolma
ATTORNEY

United States Patent Office 2,817,024
Patented Dec. 17, 1957

2,817,024

SYNCHRONIZING APPARATUS

Robert F. Karlicek, Monroe Heights, Pa., assignor to Westinghouse Electric Corporation, East Pittsburgh, Pa., a corporation of Pennsylvania Application February 29, 1956, Serial No. 568,561

6 Claims. (Cl. 307—87)

My invention relates generally to synchronizing apparatus and it has reference in particular to static automatic synchronizing apparatus and/or apparatus for checking the synchronism between two alternating-current circuits.

Generally stated, it is an object of my invention to provide a static synchronizing or synchronism checking apparatus that is simple and inexpensive to manufacture and is reliable and effective in operation.

More specifically, it is an object of my invention to provide in a synchronizing apparatus, for using a plurality of static networks and decision elements to check the voltage balance, phase sequence, and beat frequency between two alternating-current circuits to determine conditions for synchronizing.

Yet another object of my invention is to provide for using positive and negative sequence networks in conjunction with a voltage balance network, an Or element and a Not element to check condition for synchronizing two alternating-current circuits.

It is also an object of my invention to provide a static synchronizer that operates to close a circuit breaker connecting two alternating-current sources, when the conditions are correct for synchronizing, and is reset for future operations when the breaker closes.

It is an important object of my invention to provide for closing a circuit breaker after a predetermined interval of time, provided that the magnitude and phase position of the voltages of the sources to be connected remain substantially the same during the interval, and there is no voltage unbalance of either source.

Another important object of my invention is to provide for using a static Not delay element to determine the relative frequencies of the two sources for the purpose of checking the sources to determine if the conditions are right for synchronizing them.

Other objects will, in part, be obvious and will, in part, be explained hereinafter.

In practicing my invention in accordance with one of its embodiments, positive and negative sequence networks are connected to each of two alternating-current sources which are to be synchronized, and the outputs are applied to an Or element through a voltage balancing network and rectifier circuits. The output of the Or element is applied to a Not delay element which furnishes a control voltage after a timed interval for closing a circuit breaker to connect the circuits, when the conditions are correct for synchronizing them.

Figure 2:
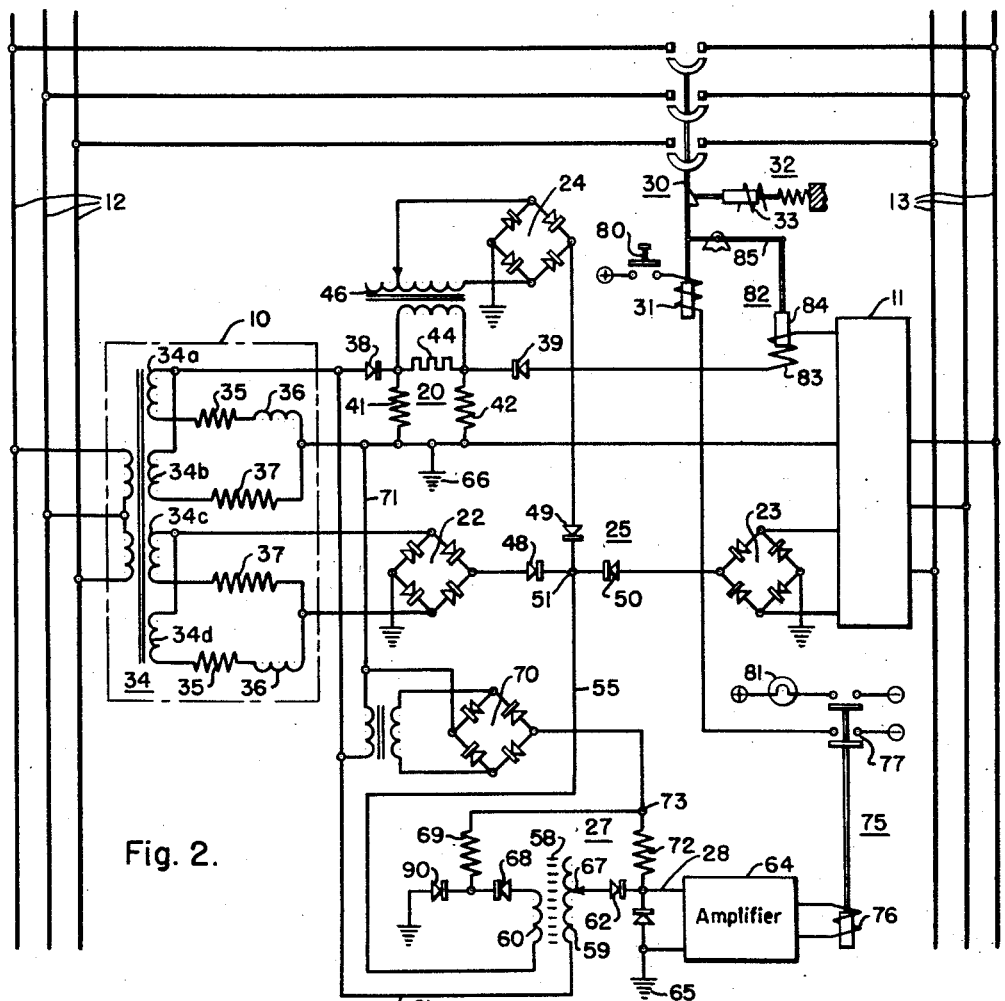

For a more complete understanding of the nature and scope of my invention, reference may be made to the following detailed description, which may be read in connection with the accompanying drawings, in which:

Figure 1 is a block diagram of synchronizing apparatus embodying the invention in one of its forms, and Fig. 2 is a schematic diagram of the apparatus shown in Fig. 1 with a circuitry of the apparatus shown in detail.

As used herein, a Not delay device is an element having an input circuit and an output circuit which produces an output signal in the absence of a signal being applied to the input circuit for a predetermined interval of time. An Or circuit is a circuit having a plurality of input circuits, to any one of which a signal may be applied to produce a signal in the output circuit.

Referring to Fig. 1, it will be seen that positive and negative sequence networks 10 and 11 are connected to alternating-current sources represented by the arrows 12 and 13, respectively, for the purpose of producing positive sequence voltages 15 and 16 and negative sequence voltages 17 and 18. The positive sequence voltages 15 and 16 are applied to a voltage balancing network 20, which produces a differential voltage 21 in response to differences in phase or magnitude between the voltages 15 and 16. The negative sequence voltages 17 and 18 are applied to full-wave rectifier circuits 22 and 23, and the differential voltage 21 is applied to a full-wave rectifier circuit 24. The outputs of the full-wave rectifier circuits are applied to an Or element 25, the output of which is applied to a Not delay element 27 which produces an output voltage 28 after a predetermined delay, which is used to effect closing of a circuit breaker to connect the sources 12 and 13 when the conditions for synchronism are right.

Referring to Fig. 2, the reference numeral 30 designates a circuit breaker for connecting the conductors 12 and 13 which are connected to different alternating-current sources. The circuit breaker is provided with a closing coil 31 and trip means 32 having a trip winding 33 which may be energized in any suitable manner to effect opening of the breaker. The positive and negative sequence networks 10 and 11 are connected to the conductors 12 and 13, such as by means of a transformer 34 having secondary windings 34a, 34b connected in circuit with a resistance element 35, a reactor element 36 and a resistor element 37 in a well-known manner to provide a positive sequence voltage. The details of the network 10 only, are shown, because of the network 11 being substantially identical therewith. The transformer 34 is also provided with additional secondary windings 34c and 34d which are connected in circuit with a resistance 37 and a resistance 35 and reactor element 36 to produce a negative sequence voltage.

The positive sequence voltages from the networks 10 and 11 are applied through rectifiers 38 and 39 to a voltage balancing network 20, which may comprise resistors 41 and 42 to which the positive sequence voltages are applied, and which are connected in bridge relation with a non-linear voltage sensitive resistance 44 which has a relatively high resistance at a low voltage and rapidly changes to a low resistance as the voltage increases. The resistance 44 may, for example, comprise a mixture of silicon carbide and clay or other such well-known combination having the described characteristics. The differential voltage appearing across the resistor 44 is applied through a control transformer 46 and the full-wave rectifier circuit 24 to the Or circuit 25 which may comprise a plurality of rectifier devices 48, 49 and 50 connected to a common junction point 51.

The negative sequence circuits are connected to the rectifier devices 48 and 50 through rectifier bridge circuits 22 and 24. The junction 51 of the Or circuit is connected by means of conductor 55 to the reset circuit of a Not delay circuit 27. This Not delay circuit may be of a type described in detail in the copending application, Serial No. 510,670, now Patent Number 2,752,510, of William G. Hall, filed May 24, 1955, comprising, for example, a saturable magnetic core 58 having gating and reset windings 59 and 60, respectively, thereon. The gating or output winding 59 may be connected to the positive phase sequence network 10 through a conductor 61 and may be connected through a rectifier device 62 to an output circuit comprising an amplifier 64 and thence to ground at 65 and back to the positive phase sequence network at the ground connection 66, for effecting saturation of the core 58 to reduce the impedance of winding 59 and produce an output voltage. The winding 59 is provided with an adjustment connection 67 which may be adjusted to provide for saturating the core 58 after a predetermined number of successive half cycles of alternating-current provided that the flux in the core 58 is not reset. Thus, the Not delay circuit will produce an output voltage only after a predetermined number of successive gating cycles so that a delay is provided between energization of the winding 59 and the time at which an output is produced.

The reset winding 60 is connected by means of the conductor 55 so as to be energized from the Or element 25 any time a voltage is applied to any of the rectifier devices 48, 49 and 50. The winding 60 is arranged to reset the magnetic flux produced in the core 58 by the winding 59, and drive it to a negative value so as to increase the impedance of the output winding. The reset circuit may be traced from the junction 51 through the conductor 55, the reset winding 60, a blocking rectifier 68, resistor 69, rectifier bridge circuit 70 which provides a direct-current bias voltage from the positive sequence network 10 and conductor 71 to ground at ground connection 66. A resistor 72 is connected between the output circuit and a junction point 73 to provide a bias current for opposing any stray magnetizing force of the winding 59 while the winding 60 is resetting the magnetic flux in the core 58.

A switch 75 having an operating winding 76 energized from the amplifier 64 is arranged to connect the closing winding 31 of the circuit breaker 30 to a source of control voltage through contact member 77. A push button switch 80 is connected in circuit with the closing winding 31 and the contact member 77 for controlling operation of the circuit breaker 30. A lamp 81 is controlled by switch 75 to indicate conditions are right for synchronism.

The positive sequence voltages from the networks 10 and 11 are continuously applied to the voltage balancing network 20, so that a differential voltage will be applied to the rectifier device 49 of the Or element 25, only if the voltages of the sources represented by the conductors 12 and 13 are either of different magnitude or are different in their relative phase position. When the voltages of the sources represented by the connectors 12 and 13 are equal, and have the same relative phase position, no voltage will be applied to the voltage rectifier device 49. Negative sequence voltages exist in the circuits represented by the conductors 12 and 13 only when a voltage unbalance exists on one of these circuits. Accordingly, voltages will be applied to the rectifier devices 49 and 50, only in the event that voltage unbalances exist on the respective systems. The output or gating winding 59 of the Not delay element is energized from the alternating source 12 through the positive sequence network 10 and begins to drive the core member 58 towards saturation during the half cycle in which the positive sequence voltage tends to circulate current from conductor 61 through winding 59 and rectifier 62 and back to ground at 65. If any one of the rectifier devices 48, 49 and 50 produce an output voltage indicating a condition undesirable for synchronizing, the reset winding 60 will be energized during the following half cycle and will reset core 58 by circulating current from conductor 55 through winding 60, rectifiers 68 and 90 and returning to ground. Should the voltages of the sources of the conductors 12 and 13 be equal, and should they remain in the same relative phase position for a predetermined time and no unbalance conditons exist on either circuit for the predetermined time, no voltage will be applied to the reset winding 60 and the gating winding 59 will therefore continue to increase the magnetization of the core member 58 for a predetermined time, until it drives it to saturation, whereupon an output voltage is applied to the amplifier 64 to effect operation of the switch 75 to light indicating lamp 81. Should it be desired to close the circuit breaker 30, all that is necessary is to close the switch 80 which may either be done manually by means of the push button shown or from a remote position by any suitable switch device and a circuit for the closing winding 31 will be completed whenever the switch 75 closes.

In order to provide for deenergizing coil 76 after the breaker has closed, means such as the variable inductance device 82 may be provided, comprising, for example, a winding 83 connected between the positive phase sequence circuit of the network 11 and the voltage balancing network 20, and a movable magnetic core member 84 which is operatively connected to the circuit breaker 30 by means of a lever 85. The core member 84 is disposed to vary the impedance of the winding 83 when the breaker is closed and thus introduce an artificial unbalance between the positive phase sequence voltages from the conductors 12 and 13. This results in a differential voltage across the resistor 44, and hence an output voltage is applied from the bridge circuit 47 to the rectifier device 49 of the Or element 25. This results in energization of the reset winding 60 which resets the magnetic flux in the core member 58 and removes the output signal from the Not delay element 27.

From the above description and the accompanying drawing, it will be seen that I have provided a simple and effective apparatus for synchronizing or checking the synchronism of two alternating-current circuits. When the system voltages are momentarily balanced, and identical in magnitude and phase position, the Not decision element begins a build up of magnetic flux in the core. However, if the relative frequencies are not substantially the same, the voltages will eventually drift out of phase and cause a sufficient voltage difference to exist, causing the Or element to supply a voltage to the Not element, thus resetting the core before the Not element has had time to build up to saturation and before it has developed an output signal. Therefore, the time delay acts as a check of the relative frequencies and will allow an output signal only if the frequencies are proper for synchronizing. Apparatus embodying the features of my invention utilizes substantially static elements which are compact and reliable in operation.

Since certain changes may be made in the above-described apparatus and different embodiments of the invention may be made without departing from the spirit and scope thereof, it is intended that all the matter contained in the above description and shown in the accompanying drawing shall be considered as illustrative and not in a limiting sense.

I claim as my invention:

1. Synchronizing apparatus for a circuit breaker operable to connect two polyphase sources comprising, means producing positive and negative sequence voltages from each source, a voltage matching network operable to produce an output voltage in response to an unbalance between the positive sequence voltages of the networks, an Or element responsive to said output voltage and the negative sequence voltages to produce an output voltage, and a Not delay element producing a control voltage to effect closing of the breaker in the absence of an output voltage from the Or element for a predetermined time.

2. In combination, a circuit breaker having a closing coil for operating it to connect two polyphase sources, a Not delay element operable to effect energization of the closing coil in response to absence of an input voltage for a predetermined interval of time, an Or element connected to apply an output voltage to the Not element in response to a voltage applied to any one of a plurality of input circuits, positive and negative sequence network means connected to each of the sources, rectifier means connected to apply negative sequence voltages to the Or element, and means including a voltage balancing bridge connected to apply a voltage to the Or element in response to a difference between the positive sequence voltages.

3. Synchronizing apparatus comprising, a circuit breaker operable to connect two alternating-current sources, closing means energizable to effect operation of the breaker, Not delay means operable to effect energization of the closing means in response to the absence of an input voltage for a predetermined time, an Or element having a plurality of input circuits and an output circuit connected to the Not delay means, a positive sequence network connected to each source, a negative sequence network connected to each source, circuit means connecting the negative sequence circuits to input circuits of the Or circuit, a non-linear voltage balance network, circuit means connecting the positive sequence networks to the voltage balance network to produce a variable response output voltage in response to a difference between the positive sequence voltages, and additional circuit means connecting the voltage balance network to another of the Or element input circuits to apply said output voltage thereto.

4. Synchronizing apparatus for a circuit breaker operable to connect two alternating-current sources comprising, a Not delay element having an input circuit and an output circuit connected to effect closing of the breaker after a timed interval in the absence of a signal applied to the input circuit during such interval, an Or element having an output circuit connected to the delay input circuit and having a pair of input circuits, a voltage balance network connected to the two sources to produce an output voltage in response to a difference in magnitude or relative phase position of the voltages of the sources, circuit means applying such output voltage to one of the input circuits of said Or element, and means responsive to closing the breaker operable to produce an output signal from the unbalance network to reset the Not element.

5. In combination, a circuit breaker operable to connect two alternating-current sources, closing means for said breaker, a Not delay circuit having an output circuit connected to effect energization of the closing means at the end of a timed interval and an input circuit energizable to prevent the output circuit from energizing the closing means, and means including a voltage balance network energized from both sources to apply an unbalance voltage to the Not element in the event that the voltages of both sources are not substantially the same in magnitude and relative phase position.

6. Synchronizing indication apparatus comprising, indicating means, a saturable magnetic core having an output winding connected to a source of electrical energy to effect saturation of the core and produce an output signal to effect energization of the indicating means after a predetermined interval of time, and an input winding opposing such saturation, a voltage balance network comparing voltages from two circuits to be synchronized, circuit means connecting the network to said input circuit to apply a blocking voltage to prevent an output if a differential exists between said voltages, and circuit means responsive to an unbalance in either circuit connected to apply a blocking signal to said input circuit.

No references cited.